United States Patent
Gomez et al.

(10) Patent No.: US 9,909,543 B2
(45) Date of Patent: Mar. 6, 2018

(54) AIR INTAKE SYSTEM FOR A WORK VEHICLE WITH ENHANCED PRE-CLEANER SERVICEABILITY

(71) Applicant: CNH Industrial America, LLC, New Holland, PA (US)

(72) Inventors: Lorenzo A. Gomez, Schiller Park, IL (US); Michael C. Bunnell, Clarendon Hills, IL (US); Mark D. Klassen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 112 days.

(21) Appl. No.: 14/945,718

(22) Filed: Nov. 19, 2015

(65) Prior Publication Data

US 2017/0145968 A1    May 25, 2017

(51) Int. Cl.
  *B01D 46/12*  (2006.01)
  *F02M 35/022*  (2006.01)
  (Continued)

(52) U.S. Cl.
  CPC ......... *F02M 35/0223* (2013.01); *B01D 45/12* (2013.01); *B01D 45/16* (2013.01);
  (Continued)

(58) Field of Classification Search
  CPC .............. B01D 46/001; B01D 46/0002; B01D 46/0004; B01D 46/0005; B01D 46/12; F02M 35/088
  (Continued)

(56) References Cited

U.S. PATENT DOCUMENTS 3,357,163 A    12/1967  Burger et al.
4,370,155 A *   1/1983  Armbruster ............ B01D 46/12
                                                              454/230
(Continued)

FOREIGN PATENT DOCUMENTS

DE          4344269 A1    7/1994
DE      102013018201 A1   4/2015
WO       2014/190206 A1  11/2014

OTHER PUBLICATIONS

Donaldson No Matter What Dust Condition, Pre-Cleaners Extend Air Filter.
(Continued)

*Primary Examiner* — Minh-Chau Pham
(74) *Attorney, Agent, or Firm* — Rickard K. DeMille; Rebecca L. Henkel (57) ABSTRACT

An air intake system for a work vehicle may generally include an intake duct defining a passageway for directing air in a flow direction through the system. The duct may also include a pre-cleaner slot defined between inner and outer surfaces of the duct and a support ledge extending circumferentially around at least a portion of an inner perimeter of the duct. The system may also include a pre-cleaner configured to be installed within the intake duct by inserting the pre-cleaner through the pre-cleaner slot in a direction extending generally perpendicular to the flow direction. In addition, the air intake system may include a cover configured to be coupled to the intake duct such that the cover extends over the pre-cleaner slot when the pre-cleaner is installed within the intake duct.

20 Claims, 5 Drawing Sheets

(51) Int. Cl.

| | | |
|---|---|---|
| *B01D 45/12* | (2006.01) | |
| *B01D 46/00* | (2006.01) | |
| *F02M 35/10* | (2006.01) | |
| *B01D 45/16* | (2006.01) | |
| *B01D 50/00* | (2006.01) | |
| *F02M 35/16* | (2006.01) | |
| *F02M 35/02* | (2006.01) | |
| *F02M 35/024* | (2006.01) | |
| *F02M 35/04* | (2006.01) | |
| *F02M 35/08* | (2006.01) | |

(52) U.S. Cl.
CPC ..... *B01D 46/0005* (2013.01); *B01D 46/0006* (2013.01); *B01D 50/002* (2013.01); *F02M 35/0203* (2013.01); *F02M 35/0216* (2013.01); *F02M 35/02416* (2013.01); *F02M 35/02433* (2013.01); *F02M 35/02483* (2013.01); *F02M 35/044* (2013.01); *F02M 35/048* (2013.01); *F02M 35/08* (2013.01); *F02M 35/10013* (2013.01); *F02M 35/10091* (2013.01); *F02M 35/164* (2013.01); *B01D 2279/60* (2013.01)

(58) Field of Classification Search
USPC ...................... 55/385.3; 123/198 E; 180/89.2
See application file for complete search history.

(56) References Cited

U.S. PATENT DOCUMENTS

| | | |
|---|---|---|
| 4,531,606 A | 7/1985 | Watanabe |
| 4,667,629 A | 5/1987 | Hagarty |
| 5,042,999 A | 8/1991 | Ernst et al. |
| 6,051,042 A | 4/2000 | Coulonvaux |
| 6,361,578 B1 | 3/2002 | Rubinson |
| 6,379,410 B1 | 4/2002 | Dudley |
| 7,041,146 B2 | 5/2006 | Bugli et al. |
| 7,115,156 B2 | 10/2006 | Schaerlund et al. |
| 7,396,375 B2* | 7/2008 | Nepsund ............ B01D 46/0004 123/198 E |
| 7,517,380 B2* | 4/2009 | Grimm ................ B01D 46/001 180/89.2 |
| 7,878,171 B2 | 2/2011 | Vandike et al. |
| 8,298,308 B2 | 10/2012 | Li |
| 8,343,247 B2 | 1/2013 | Peteln |
| 8,580,005 B2 | 11/2013 | Stieglitz et al. |
| 8,801,819 B2 | 8/2014 | Rotter et al. |
| 2004/0112020 A1* | 6/2004 | Wilson ............... B01D 46/0005 55/385.3 |
| 2009/0209190 A1 | 8/2009 | Gould |
| 2012/0047856 A1* | 3/2012 | Khami ............... B01D 46/0002 55/385.3 |
| 2014/0150384 A1* | 6/2014 | Bunnell ............... F02M 35/088 55/332 |
| 2015/0007530 A1 | 1/2015 | Cho |
| 2016/0108866 A1* | 4/2016 | Dewit ................ B01D 46/0002 55/385.3 |

OTHER PUBLICATIONS

European Search Report for European Application No. 16199597.2 dated May 24, 2017 (6 pages).

* cited by examiner

AIR INTAKE SYSTEM FOR A WORK VEHICLE WITH ENHANCED PRE-CLEANER SERVICEABILITY

FIELD OF THE INVENTION

The present subject matter relates generally to work vehicle and, more particularly, to an air intake system for a work vehicle that provides for enhanced serviceability of the system's pre-cleaner.

BACKGROUND OF THE INVENTION

Work vehicles typically include internal combustion engines that require clean air for use within the combustion process. Since many work vehicles, such as tractors and other agricultural vehicles, operate in fields and other harvesting environments in which the ambient air contains large amounts of dust, plant material and other particulates, an air intake system having an effective filter assembly is required. For example, conventional filter assemblies for work vehicles typically include a vortex or cyclone pre-cleaner configured to separate large particulates from the intake air and a porous air filter downstream of the pre-cleaner to provide the final stage of filtering prior to delivering the air into the engine.

To prevent the air filter from clogging, the large particulates separated from the intake air by the pre-cleaner must be removed from the filter assembly. Typically, such particulates are removed from the filter assembly via an outlet duct using a vacuum generated by the exhaust flow from the engine or using the vehicle's cooling fan. However, even with the use of such exhaust-driven or fan-driven aspiration systems, the pre-cleaner may become clogged with large particulates. In such instances, it may be desirable to remove the pre-cleaner from the intake duct of the air intake system to allow the pre-cleaner to be cleaned or unclogged. Currently, to service the pre-cleaner, an operator must remove a portion of the intake duct and then reach downwardly into the remaining portion of the duct in an attempt to vertically dislodge or un-wedge the pre-cleaner from the duct. Given this difficult process, operators often neglect servicing the pre-cleaner, which can lead to a decreased overall component life of the filter assembly.

Accordingly, an improved air intake system that allows for the pre-cleaner to be quickly and easily serviced would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an air intake system for a work vehicle. The air intake system may generally include an intake duct having an inner surface and an outer surface. The inner surface may define a passageway for directing air in a flow direction through the air intake system. The intake duct may also include a pre-cleaner slot defined between the inner and outer surfaces and a support ledge extending circumferentially around at least a portion of an inner perimeter of the intake duct. The air intake system may also include a pre-cleaner having an upper wall, a lower wall and a plurality of pre-cleaner elements extending between the upper and lower walls. The pre-cleaner may be configured to be installed within the intake duct by inserting the pre-cleaner through the pre-cleaner slot in a direction extending generally perpendicular to the flow direction. In addition, the air intake system may include a cover configured to be coupled to the intake duct such that the cover extends over the pre-cleaner slot when the pre-cleaner is installed within the intake duct. Moreover, when the pre-cleaner is installed within the intake duct, at least a portion of the lower wall may be sealed against the support ledge.

In another aspect, the present subject matter is directed to an air intake system for a work vehicle. The air intake system may generally include an intake duct having an inner surface and an outer surface. The inner surface may define a passageway for directing air in a flow direction through the air intake system. The inner surface may further define at least one locating groove extending along an inner perimeter of the intake duct. The intake duct may also include a pre-cleaner slot defined between the inner and outer surfaces and a support ledge extending circumferentially around at least a portion of the inner perimeter of the intake duct. The air intake system may also include a sealing member positioned on the support ledge and a pre-cleaner having an upper wall, a lower wall and a plurality of pre-cleaner elements extending between the upper and lower walls. The pre-cleaner may also include at least one tab extending outwardly from at least one of the upper wall or the lower wall. The pre-cleaner may be configured to be installed within the intake duct by inserting the pre-cleaner through the pre-cleaner slot. In addition, when the pre-cleaner is installed within the intake duct such that the tab(s) of the pre-cleaner is received within the locating groove(s) of the intake duct, the sealing member is configured to provide a sealed interface between at least a portion of the lower wall of the pre-cleaner and the support ledge of the intake duct.

In a further aspect, the present subject matter is directed to an air intake system for a work vehicle. The air intake system may generally include an intake duct having an inner surface and an outer surface. The inner surface may define a passageway for directing air in a flow direction through the air intake system. The intake duct may also include a pre-cleaner slot defined between the inner and outer surfaces. The air intake system may also include a pre-cleaner having an upper wall, a lower wall and a plurality of pre-cleaner elements extending between the upper and lower walls. The pre-cleaner may also include a handle extending outwardly from at least one of the upper wall or the lower wall. The pre-cleaner may be configured to be installed within the intake duct by inserting the pre-cleaner through the pre-cleaner slot in a direction extending generally perpendicular to the flow direction. In addition, the air intake system may include a cover configured to be coupled to the intake duct such that the cover extends over the pre-cleaner slot when the pre-cleaner is installed within the intake duct. The cover may define a cavity configured to receive the handle when the cover is positioned over the pre-cleaner slot.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved air intake system that provides for enhanced pre-cleaner serviceability. Specifically, in several embodiments, the air intake system may include an intake duct defining an opening or slot for receiving a pre-cleaner of the system. The slot may generally be defined through the side of the intake duct such that the pre-cleaner may be easily inserted into and removed from the intake duct (e.g., in a lateral direction perpendicular to the direction of flow through the duct). In addition, the air intake system may include a service cover configured to be removably coupled to the intake duct so as to cover or otherwise extend over the slot when the pre-cleaner is installed within the intake duct. As such, when it is desired to service the pre-cleaner, the cover may be decoupled from the intake duct to allow the pre-cleaner to be removed laterally from the intake duct via the slot. After cleaning or otherwise servicing the pre-cleaner, the pre-cleaner may be re-installed within the intake duct by inserting the pre-cleaner back through the slot. The cover may then be re-installed onto the intake duct to complete the servicing.

Figure 1:
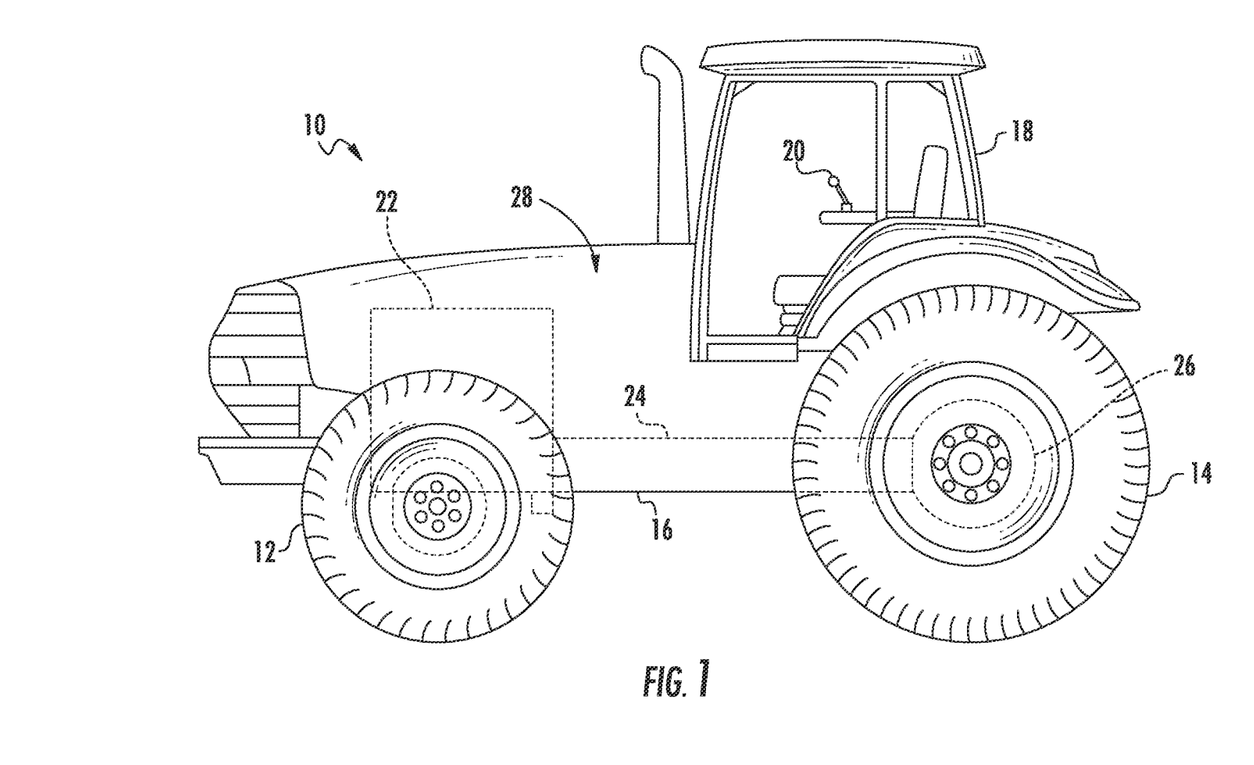
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, all-terrain vehicles, off-road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and differential are coupled, a configuration common in smaller tractors. Still other configurations may use an articulated chassis to steer the work vehicle 10, or rely on tracks in lieu of tires.

Figure 2:
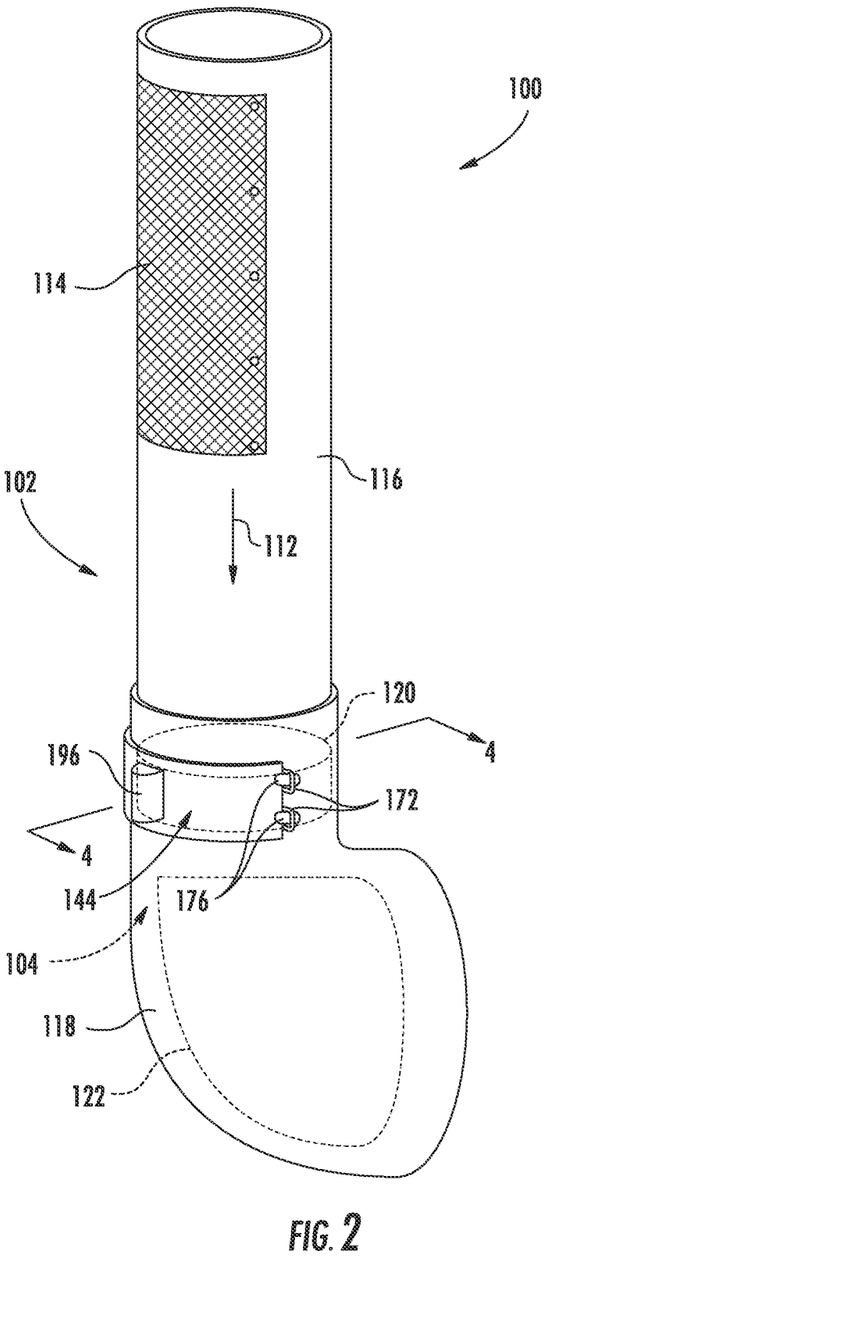
FIG. 2 illustrates a perspective view of one embodiment of an air intake system suitable for use with the work vehicle shown in FIG. 1 in accordance with aspects of the present subject matter.
Figure 3:
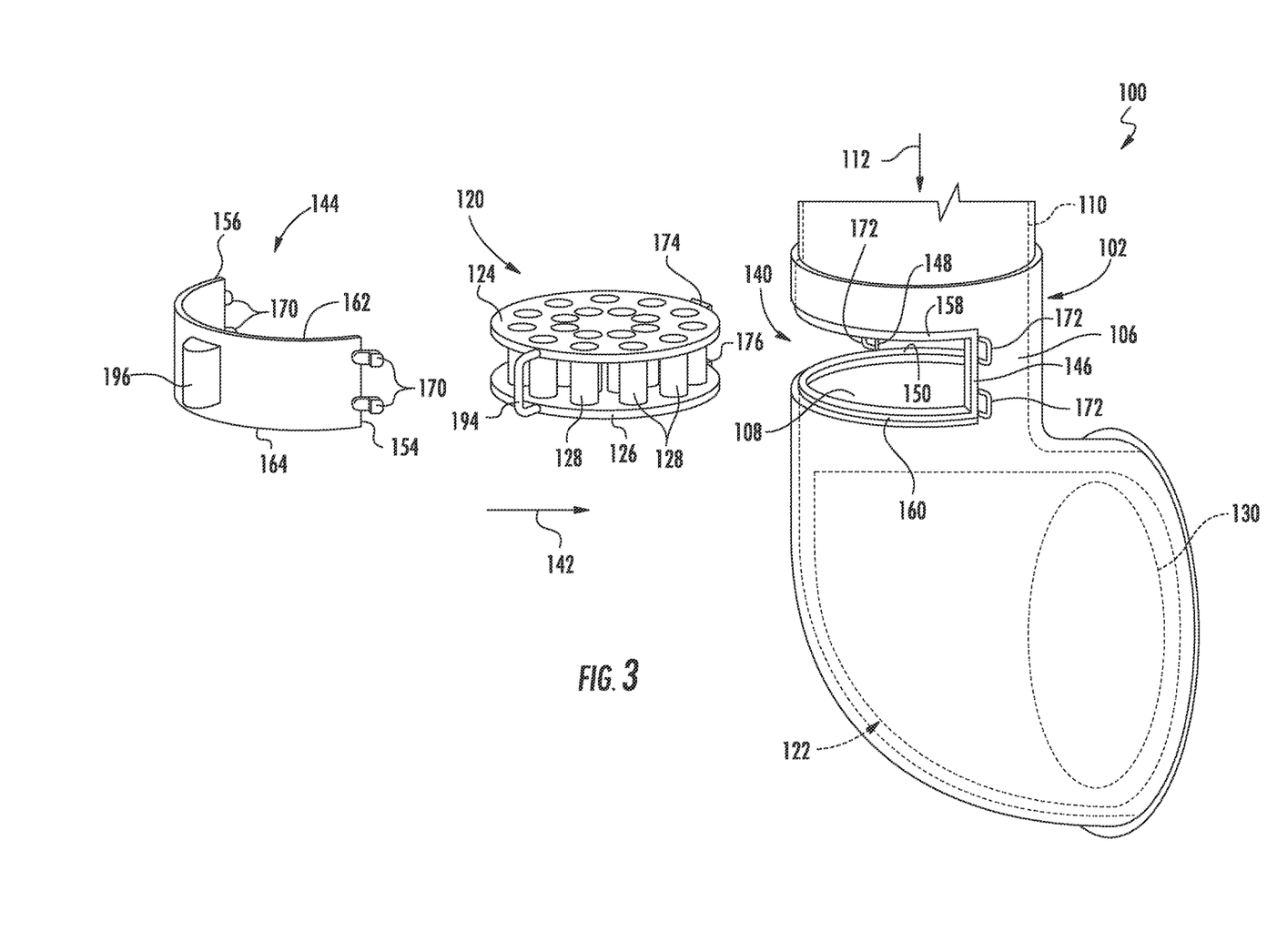
FIG. 3 illustrates a partial perspective view of the air intake system shown in FIG. 2, particularly illustrating a cover and a pre-cleaner of the air intake system exploded away from an intake duct of the system.
Figure 4:
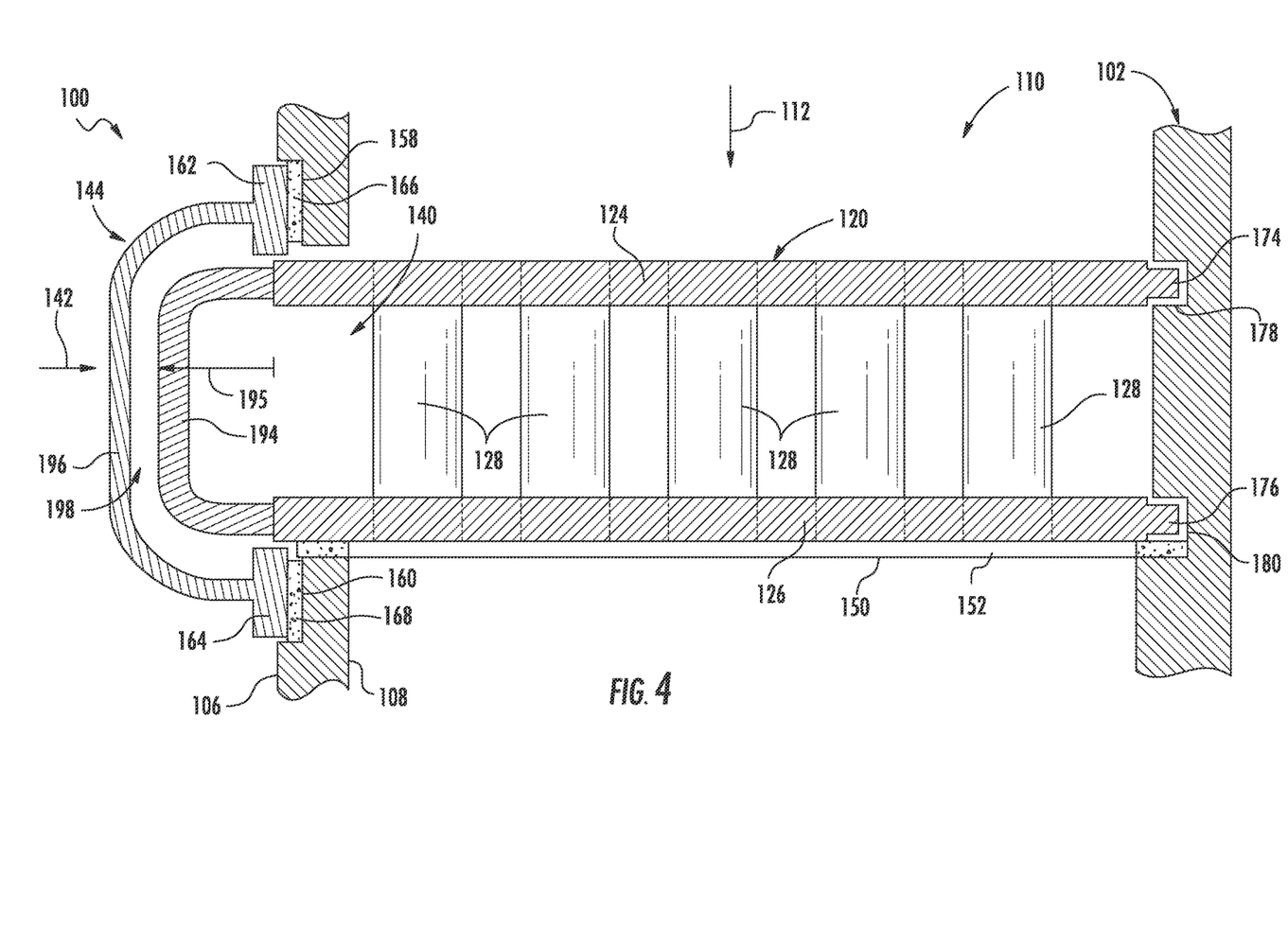
FIG. 4 illustrates a cross-sectional view of a portion of the air intake system shown in FIG. 2 taken about line 4-4.

Referring now to FIGS. 2-4, differing views of one embodiment an air intake system 100 suitable for use with the work vehicle 10 shown in FIG. 1 are illustrated in accordance with aspects of the present subject matter. Specifically, FIG. 2 illustrates a perspective view of the air intake system 100. FIG. 3 illustrates a partial perspective view of the air intake system 100 shown in FIG. 2, particularly illustrating an exploded view of various components of the system 100. Additionally, FIG. 4 illustrates a cross-sectional view of the air intake system 100 shown in FIG. 2 taken about line 4-4.

As shown, the air intake system 100 may generally include an intake duct 102 and a filter assembly 104 configured to be housed within a portion of the intake duct 102. The intake duct 102 may generally be configured to receive dirty air flowing outside the work vehicle 10 and direct such air into the filter assembly 104 for cleaning/filtering before delivery to the engine 22. Thus, in several embodiments, the intake duct 102 may generally correspond an elongated, conduit-like body including an outer surface 106 (FIGS. 3 and 4) defining the outer circumference or perimeter of the duct 102 and an inner surface 108 (FIG. 4) defining the inner circumference or perimeter of the duct 102. As is generally, understood, an internal passageway 110 (FIGS. 3 and 4) may be defined by the inner surface 108 of the intake duct 102 for directing air in a flow direction (indicated by arrows 112 in FIGS. 2-4) along the passageway 110 and through the filter assembly 104. For example, the intake duct 102 may include one or more inlet openings (not shown) for receiving air. As shown in FIG. 2, a screen 114 may be disposed over the inlet openings, thereby preventing large debris from entering the intake duct 102. The air flowing through the screen 114 and into the intake duct 102 may then be directed in the flow direction 112 along the internal passageway 110 and through the filter assembly 104 prior to being delivered to the engine 22.

As particularly shown in FIG. 2, the intake duct 102 may, in several embodiments, include an upper portion 116 for receiving air and a lower portion 118 configured to house the various components of the filter assembly 104. In one embodiment, the upper and lower portions 116, 118 may, for example, correspond to separate components configured to be coupled to one another to form the complete intake duct 102. Alternatively, the upper and lower portions 116, 118 may be formed integrally with one another.

As indicated above, the filter assembly 104 of the air intake system 100 may generally be configured to receive the dirty air flowing through the intake duct 102 and clean/filter such air for subsequent delivery to the engine 22. Thus, in several embodiments, the filter assembly 104 may include a pre-cleaner 120 and an air filter 122 disposed downstream of the pre-cleaner 120. As is generally understood, the pre-cleaner 120 may be configured to remove large sized debris or particulates contained within the air flowing into the filter assembly 104 via the intake duct 102. As particularly shown in FIGS. 3 and 4, the pre-cleaner 120 may include an upper wall 124, a lower wall 126 and a plurality of pre-cleaner elements 128 extending between the upper and lower walls 124, 126. In one embodiment, the pre-cleaner elements 128 may correspond to tubes (e.g., turbo tubes), dirt separators, and/or any other suitable elements configured to separate particulates from the air via centrifugal force. For example, the pre-cleaner elements 128 may be configured to impart a vortex or spinning motion to the flow of air entering the filter assembly 104. As a result, large particulates contained within the air may be forced radially outwardly along the inner surface 108 of the duct 102 by the centrifugal force of the vortex/spinning motion. These large particulates may then be expelled from the intake duct 102 via an outlet port (not shown) defined through a portion of the duct 102.

Additionally, the air filter 122 may generally be configured to receive the cleaned air flowing from the pre-cleaner 120 and filter such air to provide a final stage of filtering prior to delivery of the air to the engine 22. Thus, as shown in FIG. 3, the air filter 122 may generally include one or more filter elements 130 configured to catch or trap the remaining particulates contained within the cleaned air. For instance, in several embodiments, the filter element(s) 130 may be made from a fibrous, porous or mesh material that allows air to pass therethrough while catching/trapping any particulates. The cleaned/filtered air may then be directed through a suitable conduit (not shown) to the engine 22, where the air may be mixed with fuel and combusted.

As particularly shown in FIG. 3, in accordance with aspects of the present subject matter, the intake duct 102 may define a pre-cleaner slot 140 configured to allow the pre-cleaner 120 to be quickly and easily installed within and removed from the intake duct 102. Specifically, in several embodiments, the pre-cleaner 120 may be configured to be installed within (or removed from) the intake duct 102 by inserting the pre-cleaner 120 into the slot 140 (or by pulling the pre-cleaner 120 out of the slot 140) in a lateral direction (indicated by arrow 142 in FIGS. 3 and 4) extending generally perpendicular to the flow direction 112 of the air through the intake duct 102. Additionally, as shown in FIGS. 2-4, a cover 144 may be configured to be removably coupled to the intake duct 102 such that the cover 144 extends over or otherwise covers the pre-cleaner slot 140 when the pre-cleaner 120 is installed within the intake duct 102. As such, to service the pre-cleaner 120, the cover 144 may be removed from the intake duct 102 and the pre-cleaner 120 may be pulled outwardly from the duct 102 via the pre-cleaner slot 140 (e.g., by pulling the pre-cleaner 120 in the lateral direction 142 relative to the duct 102). After cleaning or otherwise servicing the pre-cleaner 120, the pre-cleaner 120 may then be re-installed into the intake duct 102 by laterally inserting the pre-cleaner 120 through the pre-cleaner slot 140. The cover 144 may then be installed back on the intake duct 102 to close-off or otherwise cover the slot 140.

As particularly shown in FIGS. 3 and 4, the pre-cleaner slot 140 may be configured to extend through the intake duct 102 (e.g., by being defined between the outer and inner surfaces 106, 108 of the duct 102) such that the slot 140 provides access to the portion of the duct 102 within which the pre-cleaner 102 is configured to be installed. Additionally, as shown in FIG. 3, the slot 140 may generally be configured to extend circumferentially around the intake duct 102 between a first slot end 146 and a second slot end 148 so as to define a sufficiently sized opening for receiving the pre-cleaner 120. It should be appreciated that the pre-cleaner slot 140 may generally be configured to extend around any suitable circumferential portion of the intake duct 102 that allows the pre-cleaner 120 to be inserted into and removed from the duct 102 via the slot 140. For example, in one embodiment, the pre-cleaner slot 140 may extend circumferentially between its first and second ends 146, 148 around an approximately 180 degree circumferential segment of the intake duct 102.

Moreover, as shown in FIGS. 3 and 4, the intake duct 102 may include a support ledge 150 extending around its inner perimeter at a location at or adjacent to the pre-cleaner slot 140. In several embodiments, the support ledge 150 may be configured to extend radially inwardly relative to the remainder of the inner surface 108 of the intake duct 102 so as to define a circumferential lip or ledge for vertically supporting the pre-cleaner 120 within the intake duct 102. For example, the lower wall 126 of the pre-cleaner 120 may be configured to be engaged against and/or positioned adjacent to the support ledge 150 when the pre-cleaner 120 is installed within the intake duct 102.

In addition, the support ledge 150 may be configured to accommodate one or more seals for sealing the pre-cleaner 120 against the inner perimeter of the intake duct 102. For example, as particularly shown in FIG. 4, a sealing member(s) 152 may be positioned on the support ledge 150 such that the sealing member 152 extends circumferentially along the ledge 150 around at least a portion of the inner perimeter of the intake duct 102. In general, the sealing member(s) 152 may be configured to create a seal between the support ledge 150 and the lower wall 126 of the pre-cleaner 120. As such, when the pre-cleaner 120 is installed within the intake duct 102 via the pre-cleaner slot 140, the sealing member 152 may be configured to provide a sealed interface between the intake duct 102 and the pre-cleaner 120 that prevents the flow of air between the outer perimeter of the pre-cleaner 120 and the inner perimeter of the intake duct 102.

It should be appreciated that the sealing member(s) 152 may generally correspond to any suitable sealing device(s) or seal(s) known in the art. For example, in several embodiments, the sealing member(s) 152 may be formed from a compressible material that is configured to be compressed between the support ledge 150 and the lower wall 126 of the pre-cleaner 120 so as to form a seal between such adjacent components. In such embodiments, the compressible material may include, but is not limited to, a rubber material, a foam material (e.g., an open- or closed-cell foam material) and/or any other suitable compressible material.

As shown in FIGS. 2 and 3, the cover 144 may generally be shaped or otherwise configured based on the size and/or shape of the pre-cleaner slot 140 such that, when the cover 144 is coupled to the duct 102, the cover 144 extends across or otherwise covers the slot 140. Specifically, as shown in FIG. 3, the cover 144 may generally define an arced or curved shape extending circumferentially between a first cover end 154 and a second cover end 156. In such an embodiment, the curvature of the cover 144 may generally be configured to match the curvature of the intake duct 102. As such, when the cover 144 is installed onto the duct 102, the first end 154 of the cover 144 may be positioned at or adjacent to the first end 146 of the pre-cleaner slot 140 while the second end 156 of the cover 144 may be positioned at or adjacent to the second end 148 of the pre-cleaner slot 140. For example, in one embodiment, the ends 154, 156 of the cover 144 may be configured to extend circumferentially beyond the ends 146, 148 of the slot 140 by a given distance such that the cover 144 overlaps portions of the outer surface 106 of the intake duct 102 extending adjacent to the ends 146, 148 of the slot 140. In addition to such an overlapped configuration (or as an alternative thereto), the ends 154, 156 of the cover 144 may be configured to be sealed against the intake duct 102 at or adjacent to the ends 146, 148 of the slot 140.

In one embodiment, the outer surface 106 of the intake duct 102 may be recessed at one or more locations adjacent to the pre-cleaner slot 140. For example, as shown in FIGS. 3 and 4, the outer surface 106 may be recessed along the top and bottom of the pre-cleaner slot 140 such that upper and lower recesses 158, 160 are defined by the outer surface 106 that extend circumferentially around the outer perimeter of the intake duct 102 between the first and second ends 146, 148 of the slot 140. In such an embodiment, corresponding upper and lower portions 162, 164 of the cover 144 may be configured to be at least partially received within the upper and lower recesses 158, 160, respectively. For instance, as shown in FIG. 4, when the cover 144 is installed onto the intake duct 102, the upper portion 162 of the cover 144 may be received within the upper recess 158 and the lower portion 164 of the cover 144 may be received with the lower recess 160, thereby providing an overlapping configuration between the intake duct 102 and the cover 144 along the top and the bottom sides of the slot 140.

Moreover, one or more sealing members 166, 168 may be positioned within the recesses 158, 160 to provide a seal between the cover 144 and the intake duct 102. For instance, as shown in FIG. 4, an upper sealing member 166 may be positioned within the upper recess 158 to provide a sealed interface between the intake duct 102 and the upper portion 162 of the cover 144. Similarly, a lower sealing member 168 may be positioned within the lower recess 160 to provide a sealed interface between the intake duct 102 and the lower portion 164 of the cover 144.

It should be appreciated that, similar to the sealing member 152 described above, the upper and lower sealing members 166, 168 may generally correspond to any suitable sealing device(s) or seal(s) known in the art. For example, in several embodiments, each sealing member 166, 168 may be formed from a compressible material that is configured to be compressed between the intake duct 102 and the cover 144 so as to form a seal between such adjacent components. In such embodiments, the compressible material may include, but is not limited to, a rubber material, a foam material (e.g., an open- or closed-cell foam material) and/or any other suitable compressible material.

Moreover, in several embodiments, the intake duct 102 and the cover 144 may include corresponding retention members for allowing the cover 144 to be removably coupled to the duct 102. For example, as shown in FIGS. 2 and 3, in one embodiment, the cover 144 may include one or more retention clips 170 extending outwardly from its first and second ends 154, 156. In such an embodiment, corresponding latches 172 or other retention members may be provided adjacent to the ends 146, 148 of the pre-cleaner slot 140 that are configured to engage the retention clips 170 when the cover 144 is installed onto the duct 102. For example, each retention clip 170 may be configured to be received within a corresponding latch 172 in order to secure the cover 144 to the intake duct 102. It should be appreciated that, in other embodiments, the intake duct 102 and the cover 144 may include any other suitable retention members and/or features configured to allow the cover 144 to be removably coupled to the duct 102.

Additionally, as shown in FIGS. 3 and 4, in one embodiment, the pre-cleaner 120 may include one or more tabs 174, 176 extending radially outwardly from its upper wall and/or its lower wall 124, 126. For example, in the illustrated embodiment, the pre-cleaner 120 includes a first tab 174 extending outwardly from the upper wall 124 and a second tab 176 extending outwardly from the lower wall 126. As particularly shown in FIG. 4, the tabs 174, 176 may be configured to be received within corresponding locating grooves 178, 180 defined along the inner perimeter of the intake duct 102. In general, the tabs 174, 176 and corresponding grooves 178, 180 may allow the pre-cleaner 120 to be properly positioned within the intake duct 102 relative to the support ledge 150. For example, in several embodiments, the locating grooves 178, 180 may be configured to extend at least partially downward (e.g., in the flow direction 112) along the inner perimeter of the intake duct 102 such that, when each tab 174, 176 is received within its corresponding locating groove 178, 180 and the pre-cleaner 120 is rotated relative to the intake duct 102, the pre-cleaner 120 may be moved relative to the intake duct 102 in the flow direction 112, thereby ensuring that a sealed interface is created between the lower wall 126 of the pre-cleaner 120 and the support ledge 150.

Figure 5:
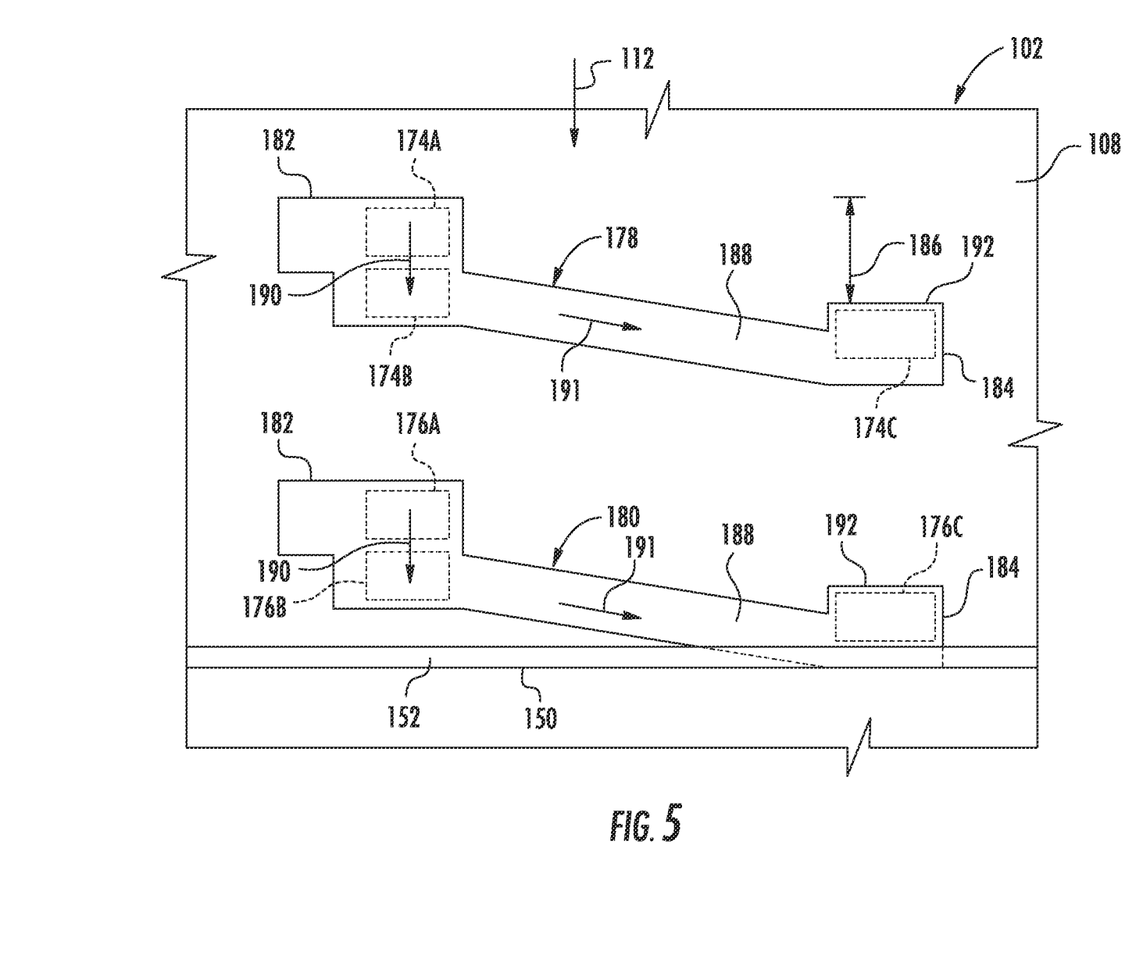
FIG. 5 illustrates an internal view of a portion of the intake duct shown in FIGS. 2-4, particularly illustrating one example of locating grooves that may be defined along an inner perimeter of the duct for locating the pre-cleaner relative to the duct.

For example, FIG. 5 illustrates a front view of one embodiment of suitable locating grooves 178, 180 that may be defined along the inner perimeter of the intake duct 102 for receiving the pre-cleaner tabs 174, 176. As shown, the intake duct 102 includes first and second locating grooves 178, 180 defined by its inner surface 108, with the first locating groove 178 being configured to receive the first tab 174 of the pre-cleaner 120 and the second locating groove 180 being configured to receive the second tab 176 of the pre-cleaner 120. In several embodiments, the locating grooves 178, 180 may be configured to define a circumferential travel path for the tabs 174, 176 along the inner perimeter of the intake duct 102 as the pre-cleaner 120 is being rotated relative to the duct 102. For example, as shown in FIG. 5, each locating groove 178, 180 may be configured to extend circumferentially along the inner perimeter of the duct 102 between a first end 182 and a second end 184. In such an embodiment, the second end 184 may be configured to be offset from the first end 182 in the flow direction 112 of the air intake system 100 (e.g., by an offset distance 186). As such, the pre-cleaner 120 may be forced downwardly in the direction of the support ledge 150 as the tabs 174, 176 are moved from the first end 182 to the second end 184 of each groove 178, 180 while the pre-cleaner 120 is being rotated relative to the duct 102. For instance, as shown in FIG. 5, each locating groove 178, 180 may include an angled portion 188 that is angled downwardly in the flow direction 112 as the angled portion 188 extends from the first end 182 to the second end 184 of the groove 178, 180. Such downward travel of the pre-cleaner 120 as the tabs 174, 176 are moved along the angled portions 188 may result in the sealing member 152 being compressed between the lower wall 126 of the pre-cleaner 120 and the support ledge 150, thereby providing an effective sealed interface between the pre-cleaner 120 and the intake duct 102.

As indicated by dashed boxes 174A, 174B in FIG. 5, when the pre-cleaner 120 is inserted within the intake duct 102 via the pre-cleaner slot 140, the tabs 174, 176 may be initially received at the open, first ends 182 of the locating grooves 178, 180. Thereafter, the pre-cleaner 120 may be pushed downwardly relative to the intake duct 102 (indicated by arrows 190) such that each tab 174, 176 is generally aligned within the angled portion 188 of its corresponding groove 178, 180 (as indicated by dashed boxes, 174B, 176B). The pre-cleaner 120 may then be rotated relative to the intake duct 102 such that the tabs 174, 176 travel along the angled portions 186 of the grooves 178, 180 (e.g., as indicated by arrows 191) in the direction of the second end 184 of each groove 178, 180. As indicated above, such movement of the pre-cleaner 120 may result in a downward force being applied against the sealing member 152 that compresses the sealing member 182 between the lower wall 126 of the pre-cleaner 120 and the support ledge 150.

Additionally, as shown in FIG. 5, each locating groove 178, 180 may include a raised portion 192 at or adjacent to its second end 184 that extends upwardly relative to the angled portion 188. As such, when the tabs 174, 176 are moved to the second ends 184 of the locating grooves 178, 180, the pre-cleaner 120 may be allowed to spring slightly upwardly relative to the intake duct 102 (e.g., due to the reactive force provided by the compressed sealing member 152) such that the tabs 174, 176 are received within the raised portions 192 of the grooves 178, 180, thereby locking the tabs 174, 176 in place. In such an embodiment, to remove the pre-cleaner 120 from the intake duct 120, the pre-cleaner 120 may be initially pushed downwardly relative to the duct 102 such that the tabs 174, 176 are moved out of the raised positions 192 and back into alignment with the angled portions 188 of the grooves 178, 180. The pre-cleaner 120 may then be rotated relative to the intake duct 102 to allow the tabs 174, 176 to travel upwardly along the angled portions 188 towards the first ends 182 of the grooves 178, 180.

It should be appreciated that the locating grooves 178, 180 shown in FIG. 5 are simply provided as one example of suitable locating features that may be provided in association with the intake duct 102 for properly locating the pre-cleaner 120 within the duct 102. In other embodiments, the intake duct 102 may include any other suitable locating features, including grooves defining any other suitable travel path for the pre-cleaner tabs 174, 176 along the inner perimeter of the intake duct 102.

Referring back to FIGS. 2-4, a handle 194 may also be provided on the pre-cleaner 120 to assist in the removal and installation of the pre-cleaner 120 relative to the intake duct 102. For example, the handle 194 may be configured to extend radially outwardly from the upper and lower walls 124, 126 of the pre-cleaner 120 so as to provide sufficient spacing for allowing an operator of the vehicle or service personnel to grasp the handle 194. Specifically, as shown in FIG. 4, the handle 194 may extend outwardly from the upper and lower walls 124, 126 a given radial distance 195. As such, the handle 194 may be used by the operator/service personal to push/pull the pre-cleaner 120 through the pre-cleaner slot 140 when inserting/removing the pre-cleaner 120 relative to the duct 102. In addition, the handle 194 may be used to rotate the pre-cleaner 120 relative to the intake duct 102 to adjust the position of the pre-cleaner tabs 174, 176 within the locating grooves 178, 180. For example, the handle 194 may be used to rotate the pre-cleaner 120 in a first direction relative to the intake duct 102 to move each tab 174, 176 from the first end 182 to the second end 184 of its corresponding locating groove 178, 180. Similarly, the handle 194 may be used to rotate the pre-cleaner 120 in the opposite direction relative to the intake duct 102 to move each tab 174, 176 from the second end 184 to the first end 182 of its corresponding locating groove 178, 180.

Additionally, as shown in the illustrated embodiment, a handle portion 196 of the cover 144 may be configured to project outwardly relative to the remainder of the cover 144 so as to define a cavity 198 (FIG. 4) for receiving the handle 194 of the pre-cleaner 120. In such an embodiment, as shown in FIG. 4, when the cover 144 is installed onto the intake duct 102 over the pre-cleaner slot 140, the handle 194 may be received within the cavity 198 defined by the handle portion 196 of the cover 144. It should be appreciated that the handle portion 196 may generally be configured to extend out-of-profile relative to the remainder of the cover 144 any suitable radial distance that allows the handle 194 to be received within the cavity 198 when the cover 144 is installed onto the intake duct 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air intake system for a work vehicle, the air intake system comprising:
    an intake duct including an inner surface and an outer surface, the inner surface defining a passageway for directing air in a flow direction through the air intake system, the intake duct including a pre-cleaner slot defined between the inner and outer surfaces, the intake duct further including a support ledge extending circumferentially around at least a portion of an inner perimeter of the intake duct;
    a pre-cleaner including an upper wall, a lower wall and a plurality of pre-cleaner elements extending between the upper and lower walls, the pre-cleaner configured to be rotatably installed within the intake duct by inserting the pre-cleaner through the pre-cleaner slot in a direction extending generally perpendicular to the flow direction; and
    a cover configured to be coupled to the intake duct such that the cover extends over the pre-cleaner slot when the pre-cleaner is installed within the intake duct,
    wherein, when the pre-cleaner is installed within the intake duct, at least a portion of the lower wall is sealed against the support ledge.

2. The air intake system of claim 1, further comprising a sealing member positioned on the support ledge, the sealing member configured to provide a sealed interface between the at least a portion of the lower wall and the support ledge.

3. The air intake system of claim 2, wherein the sealing member is formed from a compressible material, wherein the compressible material is compressed between the lower wall and the support ledge when the pre-cleaner is installed within the intake duct.

4. The air intake system of claim 1, wherein the pre-cleaner includes at least one tab extending outwardly from at least one of the lower wall or the upper wall, wherein the at least one tab is configured to be received within at least one locating groove defined along the inner perimeter of the intake duct.

5. The air intake system of claim 4, wherein the at least one locating groove extends circumferentially along the inner perimeter of the intake duct between a first end and a second end, the second end being offset from the first end in the flow direction of the intake duct.

6. The air intake system of claim 5, wherein, when the at least one tab is received within the at least one locating groove, the pre-cleaner is configured to be rotated relative to the intake duct such that the at least one tab is moved between the first and second ends of the at least one locating groove.

7. The air intake system of claim 1, wherein the outer surface of the intake duct defines a recess adjacent to the pre-cleaner slot and wherein a portion of the cover is configured to be received within the recess when the cover is coupled to the intake duct.

8. The air intake system of claim 7, further comprising a sealing member positioned within the recess so as to provide a sealed interface between the cover and the intake duct.

9. The air intake system of claim 1, wherein the pre-cleaner includes a handle extending outwardly relative to at least one of the upper wall or the lower wall, the cover defining a cavity configured to receive the handle when the cover is installed over the pre-cleaner slot.

10. The air intake system of claim 1, wherein the intake duct includes at least one retention member positioned adjacent to the pre-cleaner slot, the at least one retention member configured to engage at least one corresponding retention member of the cover when the cover is installed over the pre-cleaner slot.

11. An air intake system for a work vehicle, the air intake system comprising:
an intake duct including an inner surface and an outer surface, the inner surface defining a passageway for directing air in a flow direction through the air intake system, the inner surface further defining at least one locating groove extending along an inner perimeter of the intake duct, the intake duct including a pre-cleaner slot defined between the inner and outer surfaces, the intake duct further including a support ledge extending circumferentially around at least a portion of the inner perimeter of the intake duct;
a sealing member positioned on the support ledge; and
a pre-cleaner including an upper wall, a lower wall and a plurality of pre-cleaner elements extending between the upper and lower walls, the pre-cleaner further including at least one tab extending outwardly from at least one of the upper wall or the lower wall, the pre-cleaner configured to be installed within the intake duct by inserting the pre-cleaner through the pre-cleaner slot,
wherein, when the pre-cleaner is rotatably installed within the intake duct such that the at least one tab of the pre-cleaner is received within the at least one locating groove of the intake duct, the sealing member is configured to provide a sealed interface between at least a portion of the lower wall of the pre-cleaner and the support ledge of the intake duct.

12. The air intake system of claim 11, wherein the sealing member is formed from a compressible material, wherein the compressible material is compressed between the at least a portion of the lower wall and the support ledge when the pre-cleaner is installed within the intake duct.

13. The air intake system of claim 11, wherein the at least one locating groove extends circumferentially along the inner perimeter of the intake duct between a first end and a second end, the second end being offset from the first end in the flow direction of the intake duct.

14. The air intake system of claim 13, wherein, when the at least one tab is received within the at least one locating groove, the pre-cleaner is configured to be rotated relative to the intake duct such that the at least one tab is moved between the first and second ends of the at least one locating groove.

15. The air intake system of claim 14, wherein, when the at least one tab is moved to the second end of the at least one locating groove, the sealing member is compressed between the at least a portion of the lower wall of the pre-cleaner and the support ledge of the intake duct.

16. The air intake system of claim 11, further comprising a cover configured to be coupled to the intake duct such that the cover extends over the pre-cleaner slot when the pre-cleaner is installed within the intake duct.

17. The air intake system of claim 16, wherein the outer surface of the intake duct defines a recess adjacent to the pre-cleaner slot and wherein a portion of the cover is configured to be received within the recess when the cover is coupled to the intake duct, further comprising a sealing member positioned within the recess so as to provide a sealed interface between the cover and the intake duct.

18. The air intake system of claim 16, wherein the pre-cleaner includes a handle extending outwardly relative to at least one of the upper wall or the lower wall, the cover defining a cavity configured to receive the handle when the cover is installed over the pre-cleaner slot.

19. The air intake system of claim 16, wherein the intake duct includes at least one retention member positioned adjacent to the pre-cleaner slot, the at least one retention member configured to engage at least one corresponding retention member of the cover when the cover is installed over the pre-cleaner slot.

20. An air intake system for a work vehicle, the air intake system comprising:
an intake duct including an inner surface and an outer surface, the inner surface defining a passageway for directing air in a flow direction through the air intake system, the intake duct including a pre-cleaner slot defined between the inner and outer surfaces;
a pre-cleaner including an upper wall, a lower wall and a plurality of pre-cleaner elements extending between the upper and lower walls, the pre-cleaner further including a handle extending outwardly from at least one of the upper wall or the lower wall, the pre-cleaner configured to be rotatably installed within the intake duct by inserting the pre-cleaner through the pre-cleaner slot in a direction extending generally perpendicular to the flow direction; and
a cover configured to be coupled to the intake duct such that the cover extends over the pre-cleaner slot when the pre-cleaner is installed within the intake duct, the cover defining a cavity configured to receive the handle when the cover is positioned over the pre-cleaner slot.

* * * * *